United States Patent
Bazzi et al.

(10) Patent No.: US 7,424,423 B2
(45) Date of Patent: Sep. 9, 2008

(54) METHOD AND APPARATUS FOR FORMANT TRACKING USING A RESIDUAL MODEL

(75) Inventors: Issam Bazzi, Astoria, NY (US); Li Deng, Sammamish, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 10/404,411

(22) Filed: Apr. 1, 2003

(65) Prior Publication Data

US 2004/0199382 A1    Oct. 7, 2004

(51) Int. Cl.
    *G10L 19/04*    (2006.01)
(52) U.S. Cl. .................... 704/209; 704/220
(58) Field of Classification Search .......... 704/205–220
    See application file for complete search history.

(56) References Cited

U.S. PATENT DOCUMENTS

| | | | | |
|---|---|---|---|---|
| 3,649,765 | A * | 3/1972 | Rabiner et al. | 704/209 |
| 5,799,276 | A * | 8/1998 | Komissarchik et al. | 704/251 |
| 6,064,958 | A | 5/2000 | Takahashi et al. | 704/243 |
| 6,236,963 | B1 * | 5/2001 | Naito et al. | 704/241 |
| 6,502,066 | B2 | 12/2002 | Plumpe | 704/209 |
| 6,910,007 | B2 * | 6/2005 | Stylianou et al. | 704/207 |
| 6,980,952 | B1 * | 12/2005 | Gong | 704/234 |
| 2004/0199386 | A1 | 10/2004 | Attias et al. | 704/240 |

OTHER PUBLICATIONS

First Official Action from the European Patent Office, Appln. No. 04007986.5, filed Apr. 1, 2004.
Bazzi, I. et al., "An Expectation Maximization Approach for Formant Tracking Using a Parameter-Free Non-Linear Predictor," 2003 IEEE International Conference on Acoustics, Speech and Signal Processing, 2003.
Holmes, J. et al., "Using Formant Frequencies in Speech Recognition," 5th European Conference on Speech Communication and Technology, Eurospeech 1997.
Acero, A., "Formant Analysis and Synthesis Using Hidden Markov Models," 6th European Conference on Speech Communication and Technology, Eurospeech 1999.
Deng, Li et al., "Spontaneous Speech Recognition Using Statistical Coarticulatory Model for the Vocal-Tract-Resonance Dynamics," Journal of the Acoustical Society of America, American Institute of Physics, Dec. 2000.

* cited by examiner

*Primary Examiner*—David D Knepper
(74) *Attorney, Agent, or Firm*—Theodore M. Magee; Westman, Champlin & Kelly, P.A.

(57) ABSTRACT

A method of tracking formants defines a formant search space comprising sets of formants to be searched. Formants are identified for a first frame in the speech utterance by searching the entirety of the formant search space using the codebook, and for the remaining frames by searching the same space using both the codebook and the continuity constraint across adjacent frames. Under one embodiment, the formants are identified by mapping sets of formants into feature vectors and applying the feature vectors to a model. Formants are also identified by applying dynamic programming to search for the best sequence that optimally satisfies the continuity constraint required by the model.

8 Claims, 5 Drawing Sheets

METHOD AND APPARATUS FOR FORMANT TRACKING USING A RESIDUAL MODEL

BACKGROUND OF THE INVENTION

The present invention relates to speech recognition systems and in particular to speech recognition systems that exploit formants in speech.

In human speech, a great deal of information is contained in the first three resonant frequencies or formants of the speech signal. In particular, when a speaker is pronouncing a vowel, the frequencies and bandwidths of the formants indicate which vowel is being spoken.

To detect formants, systems of the prior art analyzed the spectral content of a frame of the speech signal. Since a formant can be at any frequency, the prior art has attempted to limit the search space before identifying a most likely formant value. Under some systems of the prior art, the search space of possible formants is reduced by identifying peaks in the spectral content of the frame. Typically, this is done by using linear predictive coding (LPC) which attempts to find a polynomial that represents the spectral content of a frame of the speech signal. Each of the roots of this polynomial represents a possible resonant frequency in the signal and thus a possible formant. Thus, using LPC, the search space is reduced to those frequencies that form roots of the LPC polynomial.

In other formant tracking systems of the prior art, the search space is reduced by comparing the spectral content of the frame to a set of spectral templates in which formants have been identified by an expert. The closest "n" templates are then selected and used to calculate the formants for the frame. Thus, these systems reduce the search space to those formants associated with the closest templates.

Although systems that reduce the search space operate efficiently, they are prone to errors because they can exclude the frequency of the actual formant when reducing the search space. In addition, because the search space is reduced based on the input signal, formants in different frames of the input signal are identified using different formant search spaces. This is less than ideal because it introduces another layer of possible errors into the search process.

Thus, a formant tracking system is needed that does not reduce the search space in such a way that the formants in different frames of the speech signal are identified using different formant search spaces.

SUMMARY OF THE INVENTION

A method of tracking formants defines a formant search space comprising sets of formants to be searched. Formants are identified for a first frame and a second frame by searching the entirety of the formant search space. Under one embodiment, the formants are identified by mapping sets of formants into feature vectors and applying the feature vectors to a model.

DETAILED DESCRIPTION OF ILLUSTRATIVE EMBODIMENTS

Figure 1:
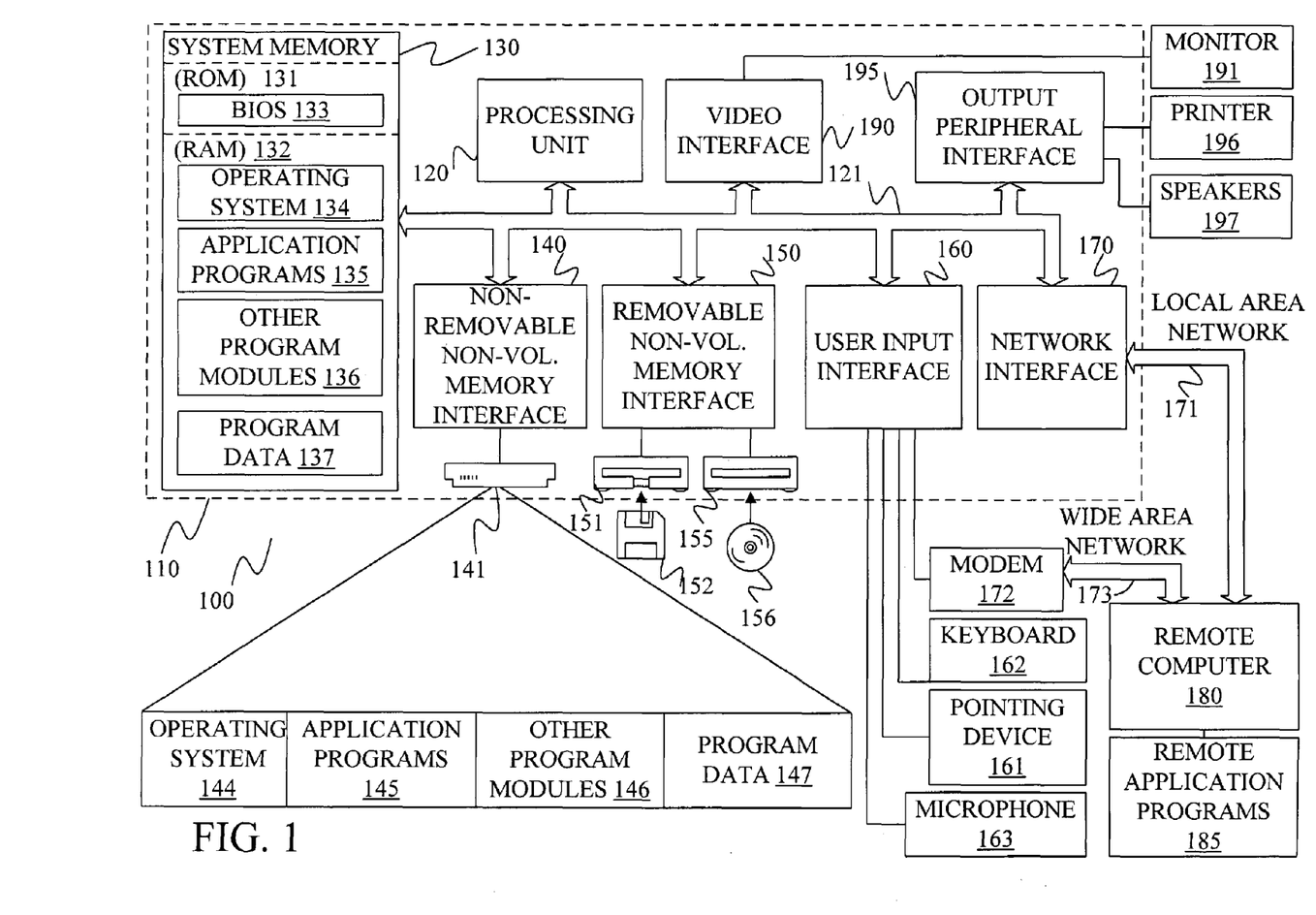
FIG. 1 is a block diagram of a general computing environment in which embodiments of the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
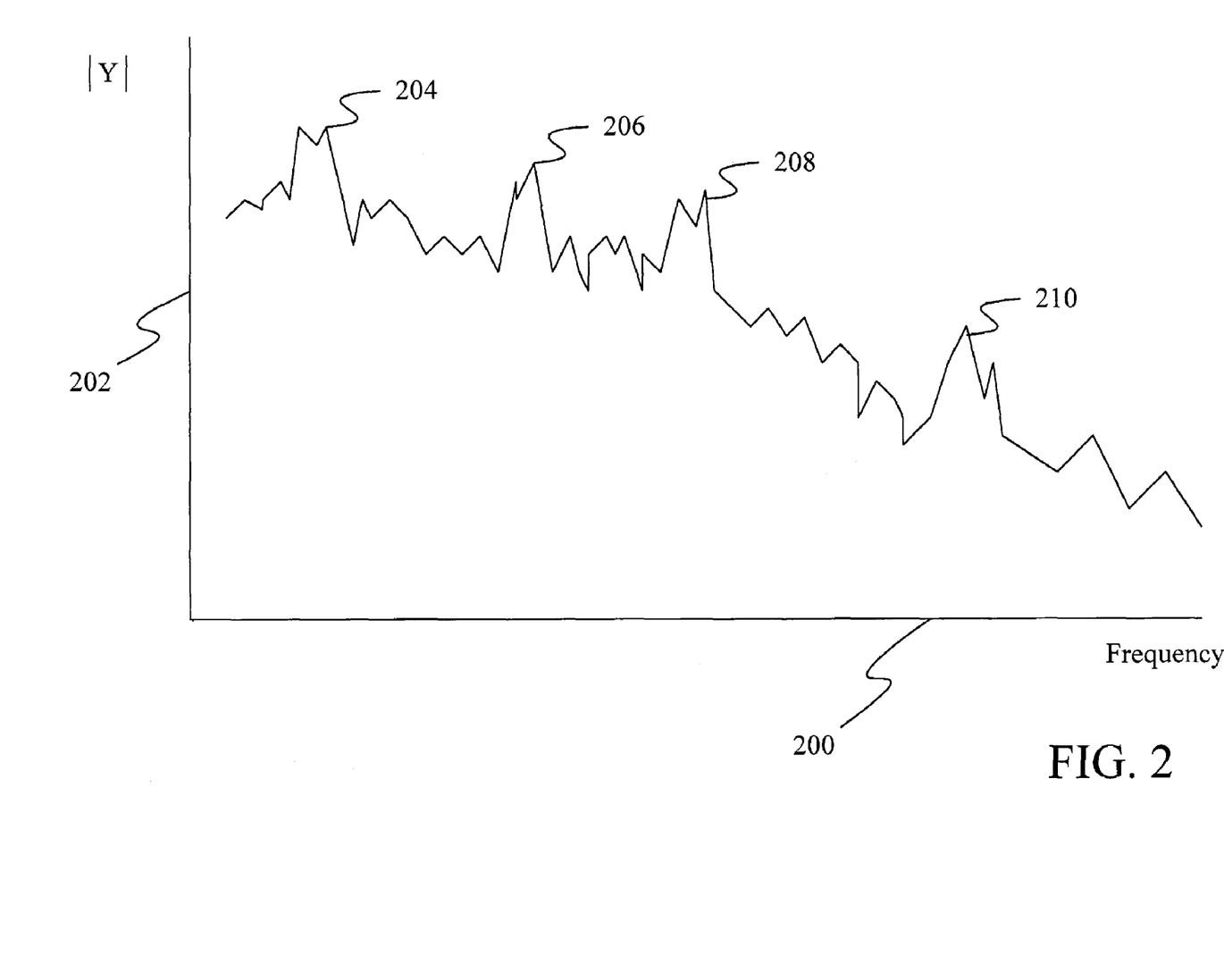
FIG. 2 is a graph of the magnitude spectrum of a speech signal.

FIG. 2 is a graph of the frequency spectrum of a section of human speech. In FIG. 2, frequency is shown along horizontal axis 200 and the magnitude of the frequency components is shown along vertical axis 202. The graph of FIG. 2 shows that human speech contains resonances or formants, such as first formant 204, second formant 206, third formant 208, and fourth formant 210. Each formant is described by its center frequency, F, and its bandwidth, B.

Figure 3:
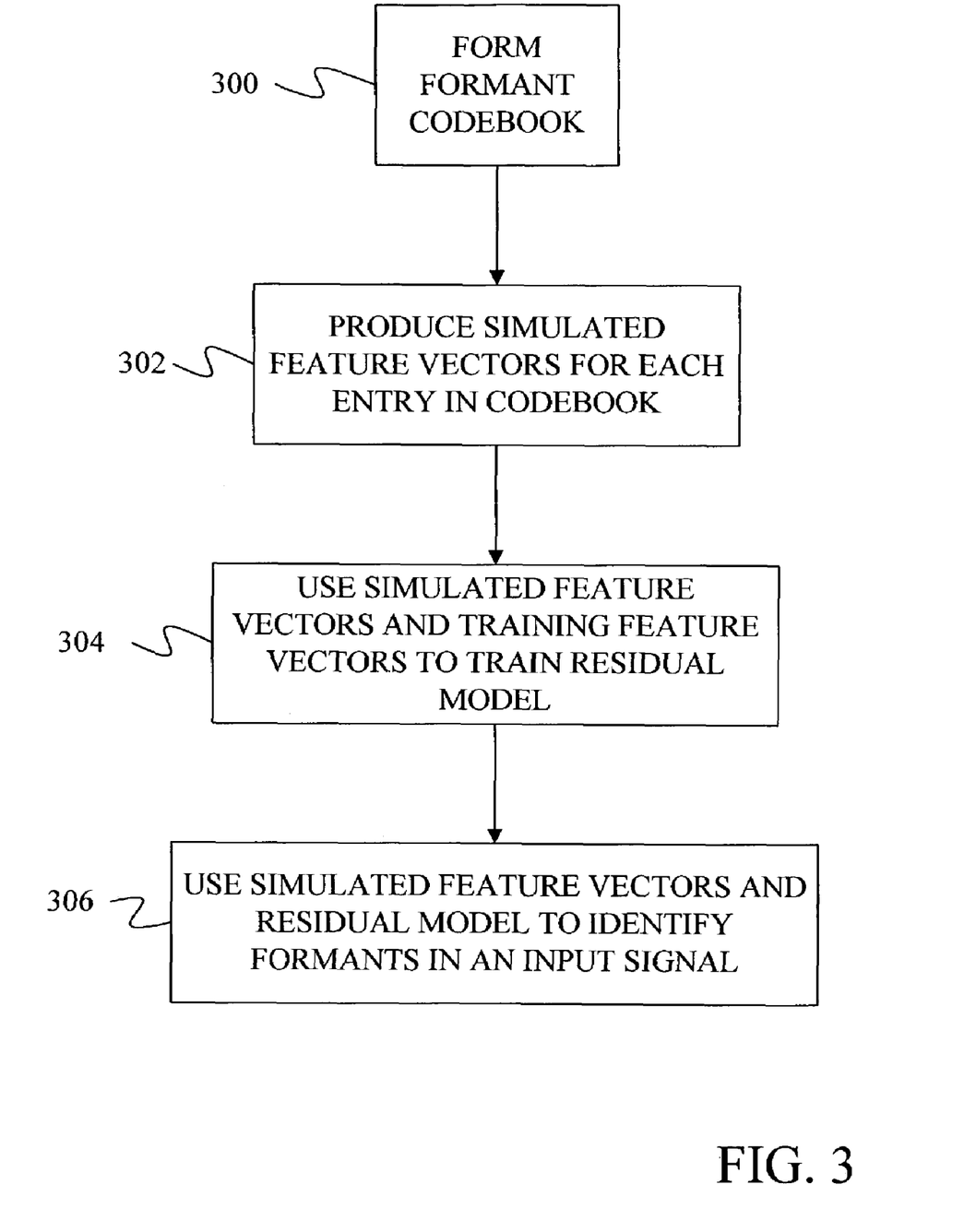
FIG. 3 is a flow diagram of a method under the present invention.

The present invention provides methods for identifying the formant frequencies and bandwidths in a speech signal. FIG. 3 provides a general flow diagram for these methods.

In step 300 of FIG. 3, a formant codebook is constructed by quantizing the possible formant frequencies and bandwidths to form a set of quantized values and then forming entries for different combinations of the quantized values. Thus, the resulting codebook contains entries that are vectors of formant frequencies and bandwidths. For example, if the codebook contains entries for three formants, the ith entry x[i] in the codebook would be a vector of $[F_{1i}, B_{1i}, F_{2i}, B_{2i}, F_{3i}, B_{3i}]$ where $F_{1i}, F_{2i},$ and $F_{3i},$ are the frequencies of the first, second, and third formants and $B_{1i}, B_{2i},$ and $B_{3i}$ are the bandwidths for the first, second, and third formants.

Under one embodiment, the formants and bandwidths are quantized according to the entries in Table 1 below, where Min(Hz) is the minimum value for the formant or bandwidth in Hertz, Max(Hz) is the maximum value in Hertz, and "Num. Quant." is the number of quantization states. In most embodiments, the formant frequencies within the ranges are mapped to a mel-frequency scale and then uniformly quantized. For the bandwidths, the range between the minimum and maximum is divided by the number of quantization states to provide the separation between each of the quantization states. For example, for bandwidth $B_1$ in Table 1, the range of 260 Hz is evenly divided by the 5 quantization states such that each state is separated from the other states by 65 Hz. (i.e., 40, 105, 170, 235, 300).

TABLE 1

|       | Min (Hz) | Max (Hz) | Num. Quant. |
|-------|----------|----------|-------------|
| $F_1$ | 200      | 900      | 20          |
| $F_2$ | 600      | 2800     | 20          |
| $F_3$ | 1400     | 3800     | 20          |
| $B_1$ | 40       | 300      | 5           |
| $B_2$ | 60       | 300      | 5           |
| $B_3$ | 60       | 500      | 5           |

The number of quantization states in Table 1 could yield a total of 1 million different sets of formants. However, because of the constraint $F_1 < F_2 < F_3$, there are only 767,500 sets of formants in the formant search space defined by the codebook.

After the codebook has been formed, each entry x[i] in the codebook is mapped into a simulated feature vector F(x[i]) at step 302. Elements used to perform this step under one embodiment of the present invention are shown in FIG. 4.

Figure 4:
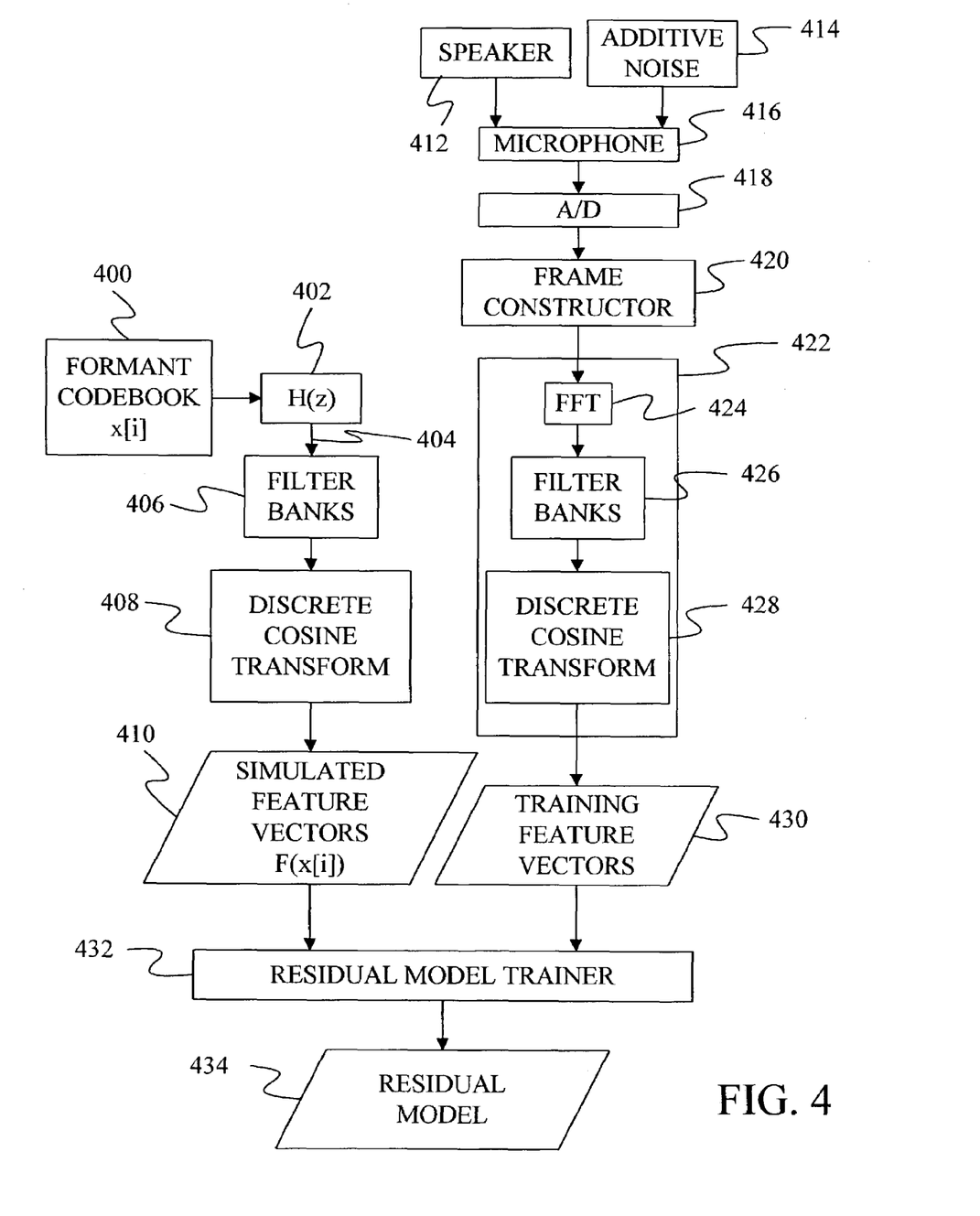
FIG. 4 is a block diagram of a training system for training a residual model under one embodiment of the present invention.

Under the embodiment of FIG. 4, a simulated feature vector for an entry in a codebook 400 is formed first by generating a z-transfer function 402 based on the entry. This z-transfer function represents an all-pole model of a speech production system that is based only on the formants in the entry. Specifically, the z-transfer function is defined as:

$$H(z) = G \prod_{k=1}^{K} \frac{1}{(1 - z_k z^{-1})(1 - z_k^* z^{-1})} \qquad \text{EQ. 1}$$

where H(z) is the transfer function, G is a gain value which in most embodiments is set to 1, and $$z = e^{j2\pi f} \qquad \text{EQ. 2}$$

$$z_k = e^{-\pi \frac{B_k}{F_s} + j2\pi \frac{F_k}{F_s}} \qquad \text{EQ. 3}$$

where f is a frequency, $F_s$ is a sampling frequency used to sample input speech signals, $F_k$ is the frequency of the kth formant of K formants in the entry, and $B_k$ is the bandwidth of the kth formant.

The transfer function H(z) is then used to generate a simulated spectral distribution 404 representing the frequency content of a speech signal made up of only the formants in the entry. This is done by calculating the value of H(z) for a plurality of different frequencies f.

The spectral distribution is then applied to a set of filter banks 406, which emphasize certain frequency bands in the spectral distribution as is well known in the art. The filtered distribution is then applied to a discrete cosine transform function 408, which produces the feature vector 410 for the entry. The initial feature vector typically includes an element for the d.c. or 0 Hz contribution to the speech signal. To improve the performance of the system, this element is removed from the feature vector in most embodiments of the present invention.

The process described above is repeated for each entry in the codebook so that there is a separate simulated feature vector for each entry.

Once the simulated feature vectors F(x[i]) 410 have been formed, they are used to train a residual model at step 304. The residual model is a model of the differences between a set of observation training feature vectors and the simulated feature vectors. In terms of an equation:

$$r_t = o_t - F(x) \qquad \text{EQ. 4}$$

where $r_t$ is the residual, $o_t$ is the observed training feature vector at time t and F(x) is a simulated feature vector.

Under one embodiment, $r_t$ is modeled as a single Gaussian with mean μ and covariance Σ, where μ is a vector with a separate mean for each component of the feature vector and Σ is a diagonal covariance matrix with a separate value for each component of the feature vector.

To produce the observed training feature vectors used to train the residual model, a human speaker 412 generates an acoustic signal that is detected by a microphone 416, which also detects additive noise 414. Microphone 416 converts the acoustic signals into an analog electrical signal that is provided to an analog-to-digital (A/D) converter 418. The analog signal is sampled by A/D converter 418 at the sampling frequency $F_s$ and the resulting samples are converted into digital values. In one embodiment, A/D converter 418 samples the analog signal at 16 kHz with 16 bits per sample, thereby creating 32 kilobytes of speech data per second. The digital samples are provided to a frame constructor 420, which groups the samples into frames. Under one embodiment, frame constructor 420 creates a new frame every 10 milliseconds that includes 25 milliseconds worth of data.

The frames of data are provided to a feature extractor 422, which in one embodiment consists of a Fast Fourier Transform (FFT) 424, filter bank 426 and Discrete Cosine Transform 428. FFT 424 converts the time domain digital values into a set of frequency domain digital values representing the spectral content of the frame. The spectral content is then passed through filter bank 426 and discrete cosine transform 428, which filter and transform the spectral content in a manner similar to the way in which filter bank 406 and discrete cosine transform 408 filter and transform the spectral distribution for the entries in the formant codebook. The output of discrete cosine transform 428 is a set of training feature vectors 430 representing the training speech signal. Note that the d.c. or 0 Hz component of the training vectors is removed if this element was removed from the simulated feature vectors.

Filter banks 406 and 426 and Discrete Cosine Transforms 408 and 428 may be replaced with other elements as long as the same processing is performed on the spectral distribution of the formant codebook entries and the spectral content of the frames of training speech. Thus, the present invention is not limited to any one particular type of feature vector.

The simulated feature vectors 410 and the training feature vectors 430 are used by a residual model trainer 432 to form a residual model 434. Under one embodiment, residual model trainer 432 uses an Expectation Maximization (EM) algorithm to train the mean μ and covariance matrix Σ of the residual model. Using standard EM calculations and assuming that the hidden formant values are uniformly distributed, update equations for the mean and covariance are found to be:

$$\hat{\mu} = \frac{1}{T}\sum_{t=1}^{T} \frac{\sum_{i=1}^{I}(o_t - F(x[i])) \cdot N((o_t - F(x[i])); \mu', \Sigma')}{\sum_{i=1}^{I} N((o_t - F(x[i])); \mu', \Sigma')}$$  EQ. 5

$$\hat{\Sigma} = \frac{1}{T}\sum_{t=1}^{T} \frac{\sum_{i=1}^{I}(o_t - F(x[i]) - \hat{\mu})^2 \cdot N((o_t - F(x[i])); \mu', \Sigma')}{\sum_{i=1}^{I} N((o_t - F(x[i])); \mu', \Sigma')}$$  EQ. 6 where $\hat{\mu}$ is the updated mean, $\hat{\Sigma}$ is the updated covariance value, $N((o_t - F(x\lfloor i \rfloor)); \mu',\Sigma')$ is the Gaussian residual model having a mean $\mu'$ determined during a previous training iteration and a covariance matrix $\Sigma'$ determined during a previous training iteration, I is the number of entries in the codebook, and T is the number of frames in the training utterance. Note that Equations 5 and 6 are performed for each component of the mean vector and each cell of the covariance matrix. Thus, in Equations 5 and 6, the differences $(o_t - F(x\lfloor i \rfloor)) - \hat{\mu})$ and $(o_t - F(x\lfloor i \rfloor))$ are calculated on a component-by-component basis.

Residual model trainer 432 updates the mean and covariance multiple times, each time using the mean and covariance from the previous iteration to define the model used in Equations 5 and 6. After the mean and covariance reach stable values, they are stored as residual model 434.

Once residual model 434 has been constructed it can be used in step 306 of FIG. 3 to identify formants in an input speech signal. A block diagram of a system for identifying formants is shown in FIG. 5.

Figure 5:
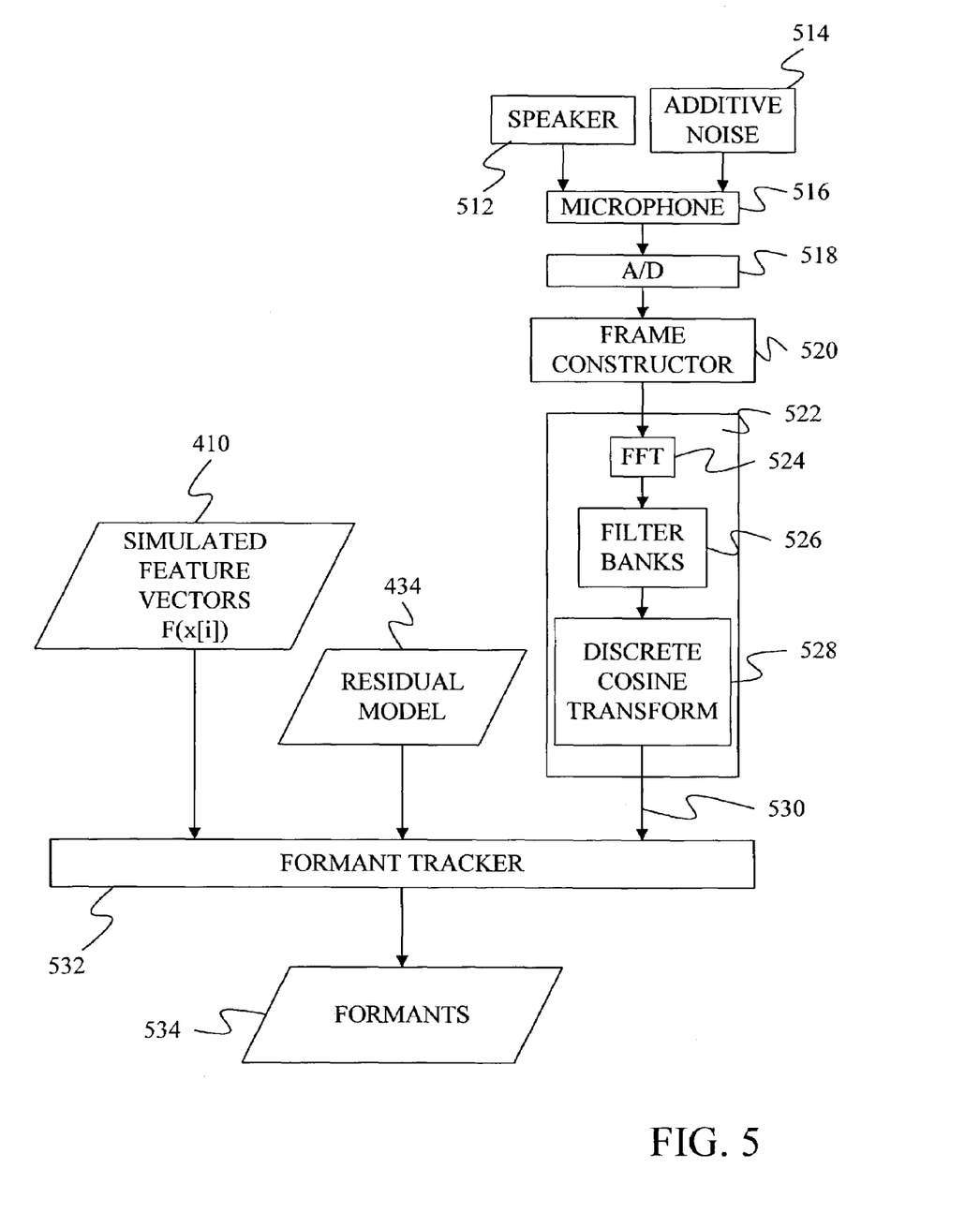
FIG. 5 is a block diagram of a formant tracking system under one embodiment of the present invention.

In FIG. 5, a speech signal is generated by a speaker 512. The speech signal and additive noise 514 are converted into a stream of feature vectors 530 by a microphone 516, A/D converter 518, frame constructor 520, and feature extractor 522, which consists of an FFT 524, filter banks 526, and a Discrete Cosine Transform 528. Note that microphone 516, A/D converter 518, frame constructor 520 and feature extractor 522 operate in a similar manner to microphone 416, A/D converter 418, frame constructor 420 and feature extractor 422 of FIG. 4. Note that if the d.c. component of the feature vectors has been removed from the simulated feature vectors, it is also removed from the input feature vectors produced by feature extractor 522.

The stream of feature vectors 530 is provided to a formant tracker 532 together with residual model 434 and simulated feature vectors 410. Formant tracker 532 uses one of several techniques under the present invention to identify a set of formants for each frame of the speech signal.

Under one set of techniques of the present invention, formant tracker 532 determines the formants for each frame independently such that the formants of a current frame are not dependent on the formants in other frames. Under one such technique, a maximum likelihood determination is made in which the formant entry x[i] in the codebook that maximizes the probability in the residual model is selected as the formant set for the frame. In terms of an equation:

$$\hat{x}_{map} = \arg\max_{i} N((o_t - F(x\lfloor i \rfloor)); \mu, \Sigma)$$  EQ. 7

The embodiment of Equation 7 is limited to finding formants that are in the quantized entries in the codebook. To avoid this limitation, a second embodiment of the present invention identifies the formants for a frame using a minimum mean squared error (MMSE) estimate that is given by:

$$\hat{x}_{MMSE} = \Sigma_{i=1}^{I} x[i] N((o_t - F(x[i])); \mu, \Sigma)$$  EQ. 8 where equation 8 is evaluated for each component of the x[i] vector. Thus, each formant frequency and bandwidth in the final identified vector $\hat{x}_{MMSE}$ is a weighted sum of the formant frequencies and bandwidths in the entries in the codebook, where the weighting value is the probability generated by the residual model when using the codebook entry. Using equation 8, continuous values of the formant frequencies and bandwidths are possible.

In other embodiments of the present invention, formant tracker 532 utilizes continuity constraints when identifying formants. Under one such embodiment, the values of the formants at the current frame are dependent on the values of the formants at a previous frame such that:

$$x_t = x_{t-1} + w_t$$  EQ. 9 where $x_t$ is the set of formant frequencies and bandwidths at frame t, $x_{t-1}$ is the set of formant frequencies and bandwidths at previous frame t−1, and $w_t$ is a Gaussian with zero mean and a diagonal covariance $\Sigma_w$ that is set so that each value along the diagonal is proportional to a quantization error associated with a particular component in the vectors of the codebook. This quantization error is equal to the range of possible values for the element of the formant vector divided by the number of quantization states for that element. For example, the variance associated with the frequency of formant $F_1$ would be proportional to the ratio of the range of possible values for the frequency of formant $F_1$ (700 Hz) to the number of quantization states used to quantize the frequency of formant $F_1$ (20). Thus, the variance for the frequency of formant $F_1$ would be proportional to 35.

Using this model, the probability of transitioning from a set of formants in a previous frame to a set of formants in a current frame, $p(x[i_t] | x[i_{t-1}])$, is found by applying the set of formants of the current frame to a Gaussian distribution with a mean equal to the set of formants for the previous frame and a covariance matrix equal to $\Sigma_w$.

The sequence of formants in a sequence of feature vectors can then be identified using a MAP estimate of:

$$\hat{x}_{MAP} = \arg\max_{i_1 \ldots i_T} \left( \prod_{t=1}^{T} N((o_t - F(x[i])); \mu, \Sigma) \right) \cdot p(x[i_1]) \cdot \left( \prod_{t=2}^{T} N\left(x[i_t]; x[i_{t-1}], \Sigma_w\right) \right)$$  EQ. 10 where the first product on the right hand side is the probability of a sequence of sets of formants as predicted by the residual model and the remaining products are transition probabilities for transitioning between sets of formants. Thus, equation 10 provides a total probability of a sequence of sets of formants for a sequence of frames of the speech signal.

Equation 10 can be estimated using a standard Viterbi search in which there is a separate node for each entry in the formant codebook at each frame. The search then involves moving forward through the frames, extending paths into the nodes in each new frame using equation 10. At each frame, low probability paths can be pruned, thereby reducing the number of active paths being considered. When the last frame is reached, a lattice of the top "n" paths has been produced. The most probable path is then selected and the sets of formants associated with the nodes along this path are identified as the formant sequence for the speech signal.

In a further embodiment of the present invention, the Viterbi search described above is extended to form a minimum mean square error (MMSE) estimate of the formants. Instead of selecting the most probable path at the last frame, each of the "n" best paths is used to form a MMSE estimate of the formants at each frame. For any given frame, the MMSE estimate is equal to the weighted sum of the formant nodes that have paths passing through them in the frame. The weighting value applied to a node is equal to the probability of the most likely path leading into that node times the probability of the most likely path exiting that node. In terms of an equation:

$$\hat{x}_{MMSE} = \frac{\sum_{v=1}^{V} x[v] \max p(path_{v:1 \to s}) \cdot \max p(path_{v:s+1 \to T})}{\sum_{v=1}^{V} \max p(path_{v:1 \to s}) \cdot \max p(path_{v:s+1 \to T})} \quad \text{EQ. 11}$$

where $$\max p(path_{v:1 \to s}) = \quad \text{EQ. 12}$$
$$\operatorname*{argmax}_{i_1 \ldots i_s} \left( \prod_{t=1}^{s} N((o_t - F(x[i])); \mu, \Sigma) \right) \cdot p(x[i_1]) \cdot \left( \prod_{t=2}^{s} N\left(x[i_t]; x[i_{t-1}], \sum_w \right) \right)$$

$$\max p(path_{v:s+1 \to T}) = \operatorname*{argmax}_{i_s \ldots i_T} \left( \prod_{t=s+1}^{T} N((o_t - F(x[i])); \mu, \Sigma) \right) \cdot \left( \prod_{t=s+1}^{T} N\left(x[i_t]; x[i_{t-1}], \sum_w \right) \right) \quad \text{EQ. 13}$$

and V defines the set of nodes in the frame that are in paths identified by the Viterbi decoding.

Although four techniques for tracking formants using a residual model and a mapping from the formant space to the feature vector space have been described above, the present invention is not limited to these formant tracking techniques. Other techniques that utilize a residual model and/or a mapping from the formant space to the feature vector space are within the scope of the present invention.

Although the present invention has been described with reference to particular embodiments, workers skilled in the art will recognize that changes may be made in form and detail without departing from the spirit and scope of the invention.

What is claimed is:

1. A method of tracking formants in a speech signal, the method comprising:
    defining a formant search space comprising sets of formants;
    identifying formants in a first frame of the speech signal using the entirety of the formant search space by utilizing a residual model that models a difference between an input feature vector representing a frame of the speech signal and a feature vector mapped from a set of formants, wherein utilizing the residual model comprises sequentially applying feature vectors mapped from each of the sets of formants in the formant search space to the residual model to identify a probability for each set of formants; and
    identifying formants in a second frame of the speech signal using the entirety of the formant search space.

2. The method of claim 1 wherein the residual model is trained using an Expectation Maximization algorithm.

3. The method of claim 1 wherein identifying formants in the first frame comprises selecting the set of formants with the highest probability as the set of formants for the first frame.

4. The method of claim 1 wherein identifying formants in the first frame comprises performing a minimum mean squared error calculation using each of the sets of formants in the formant search space and the probabilities for the sets of formants.

5. The method of claim 1 wherein identifying a probability for a set of formants further comprises determining a probability for transitioning from a set of formants identified in a previous frame to the set of formants in the first frame.

6. The method of claim 5 further comprising identifying a total probability for each of a plurality of sequences of sets of formants for a sequence of frames in the speech signal.

7. The method of claim 6 wherein identifying a set of formants for the first frame comprises selecting the sequence of sets of formants with the highest total probability.

8. The method of claim 6 wherein identifying a set of formants for the first frame comprises making a minimum mean square error calculation using the sets of formants aligned with the first frame in each of the sequences of sets of formants.

* * * * *